United States Patent [19]

Spear

[11] 4,417,744
[45] Nov. 29, 1983

[54] BICYCLE SEATPOST ASSEMBLY
[75] Inventor: Kenneth J. Spear, St. Marys, Ohio
[73] Assignee: Huffy Corporation, Miamisburg, Ohio
[21] Appl. No.: 364,718
[22] Filed: Apr. 2, 1982
[51] Int. Cl.³ .............................................. B62K 19/36
[52] U.S. Cl. ................................. 280/281 R; 248/411; 280/287; 403/104
[58] Field of Search ................... 280/287, 278, 281 R; 248/297.2, 411; 403/104, 106, 108, 109, 21; 297/195

[56] References Cited
U.S. PATENT DOCUMENTS

| | | | |
|---|---|---|---|
| 689,467 | 12/1901 | Dikeman | 208/281 R |
| 1,884,497 | 10/1932 | Abbott | 248/411 |
| 3,847,489 | 11/1974 | Van Riper | 403/110 |
| 3,849,008 | 11/1974 | Boucher et al. | 403/104 |
| 3,955,828 | 5/1976 | Boudreau | 280/279 |
| 4,011,700 | 3/1977 | Sado | 403/104 |
| 4,120,512 | 10/1978 | Newlands | 280/281 R |

Primary Examiner—Joseph F. Peters, Jr.
Assistant Examiner—Donn McGiehan
Attorney, Agent, or Firm—Biebel, French & Nauman

[57] ABSTRACT

A seatpost assembly is used in combination with a tubular seat mast of a bicycle having a radial hole through an upper rearward wall of the seat mast and includes a cylindrical seatpost sized to telescope within the seat mast and defining a longitudinal slot having side walls forming opposing channels, a lock nut for receiving a bolt and positioned within the slot such that it slidably engages the opposing channels, and a threaded bolt extending through the radial hole and the rearward seat mast wall and into the slot to engage the lock nut. The bolt has a head such that, when the bolt is threaded into the lock nut, a portion of the seatpost and a portion of the seat mast are clamped together between the lock nut and bolt head to prevent movement of the seatpost relative to the seat mast.

4 Claims, 3 Drawing Figures

U.S. Patent  Nov. 29, 1983  4,417,744
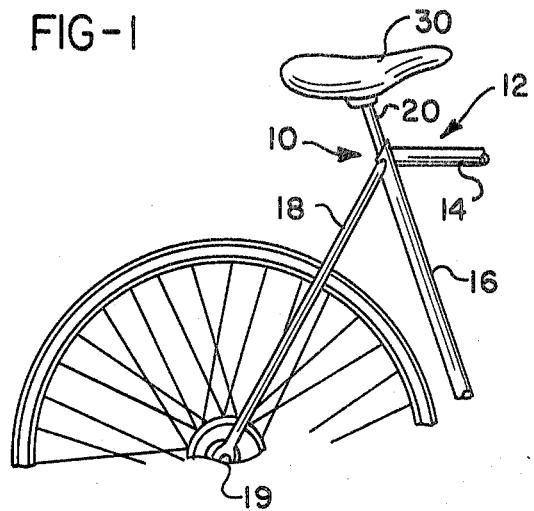
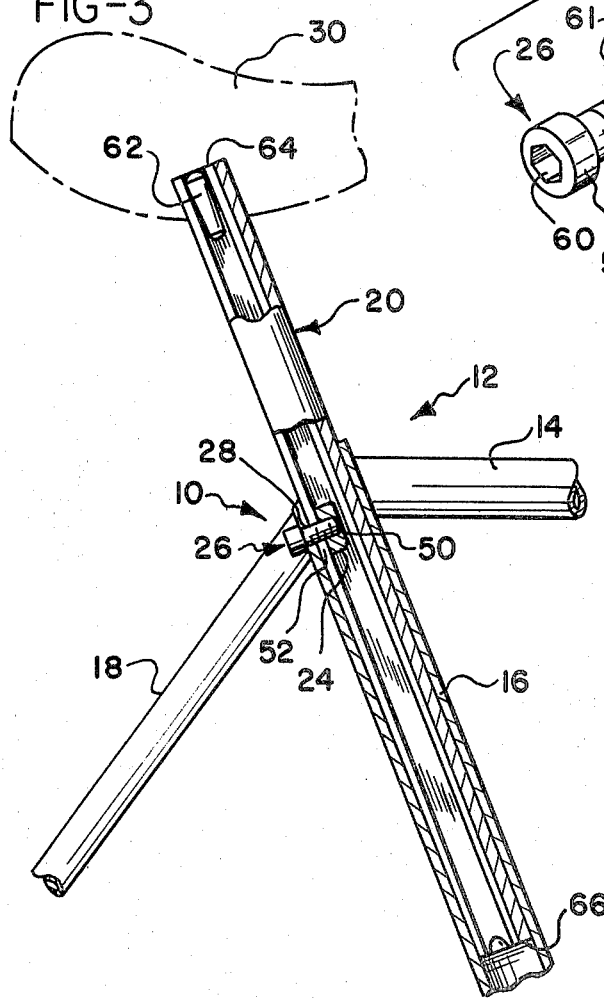
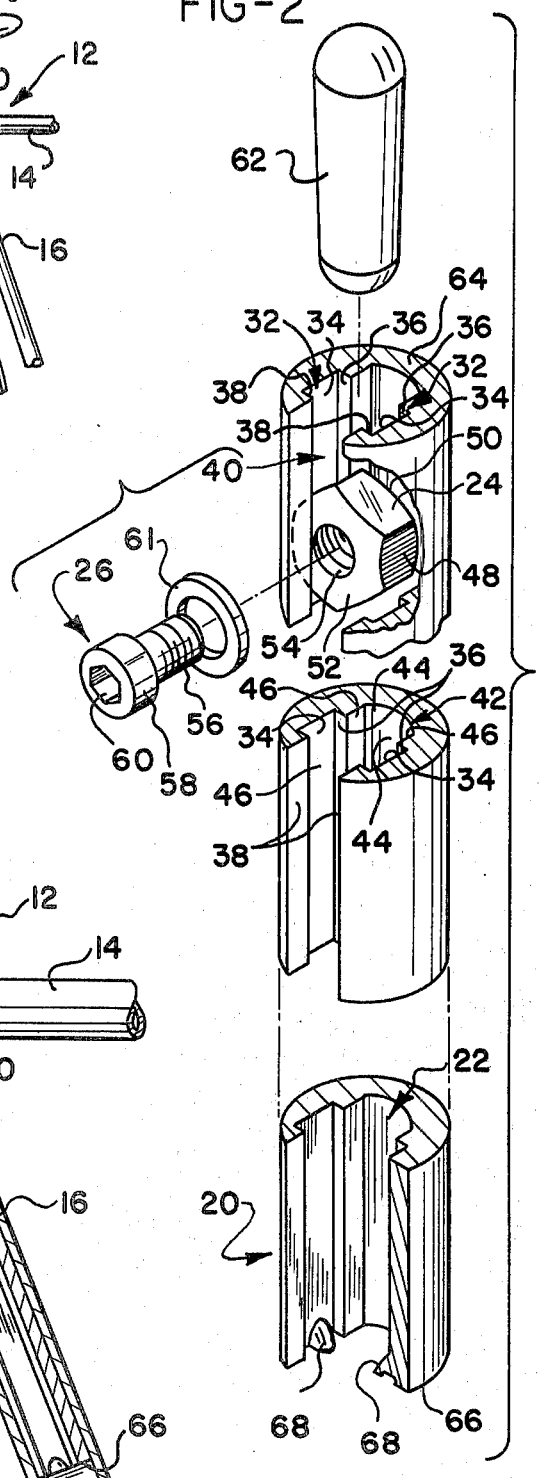

BICYCLE SEATPOST ASSEMBLY

BACKGROUND OF THE INVENTION

1. Field of the Invention

The present invention relates to bicycle seatpost assemblies and, in particular, to seatpost assemblies utilizing a clamping mechanism to fix the seatpost relative to the seat mast of the bicycle.

2. Prior Art

The seatpost assembly most commonly used on bicycles consists of a split collar mounted to an upper end of the seat mast and having ends which form flanges for receiving a nut and bolt combination. The seatpost used with this collar is substantially tubular in shape and sized to telescope within the seat mast. To adjust the seatpost with respect to the seat mast, the nut and bolt combination is loosened to permit the ends of the split collar to separate, thereby allowing the seatpost to slide relative to the seat mast. When the seatpost and seat which it supports are adjusted to the desired position, the nut and bolt combination is tightened to close the gap in the split collar, thereby clamping the collar against the seatpost and preventing further movement of the seatpost relative to the seat mast and collar.

While this type of seatpost assembly provides an effective means for adjustably mounting a seatpost to the seat mast of a bicycle, it is becoming undesirable from an aesthetic standpoint. With modern multi-speed bicycle designs, it is preferable to provide a streamlined bicycle frame whose various components blend into one another to provide a shape which is pleasing to the eye and at the same time minimizes wind resistance.

Accordingly, it is desirable to provide a seatpost assembly which is contained within the seat mast itself and does not require external collars or other structure which extends laterally outwardly from the seat mast to provide additional surfaces which create wind resistance. At the same time, such a seatpost assembly must be relatively simple to adjust and must provide a positive frictional engagement between the seatpost and seat mast to prevent relative movement during operation.

SUMMARY OF THE INVENTION

The present invention provides a seatpost assembly for a bicycle which is contained entirely within a bicycle seat mast save for a clamping bolt which extends rearwardly from the seat mast so that it does not provide a surface which creates wind resistance. In addition, the seatpost assembly of the present invention contains relatively few components and is relatively simple to fabricate, thereby providing a low cost assembly which is ideal for mass production. Furthermore, the seatpost assembly of the present invention provides a positive frictional engagement between the seatpost and seat mast such that the seatpost cannot move relative to the seat mast during use.

The seatpost assembly of the present invention is used in combination with a bicycle tubular seat mast having a radial hole through an upper rearward wall and includes a cylindrical seatpost sized to telescope within the seat mast and defining a longitudinal slot having side walls forming opposing channels, a self-locking nut positioned within the slot and sized to slidably engage the opposing channels, and a threaded bolt extending through the radial hole in the seat mast wall and into the lock nut within the slot. The bolt includes a head so that the shank of the bolt may be threaded into the lock nut to clamp the seatpost and seat mast between the bolt head and lock nut.

The seatpost preferably is formed so that the lock nut may be sealed within it to prevent it from sliding out of the slot once the seatpost is mounted within the seat mast of the bicycle. One means includes crimping the slot at a lower end of the seatpost to create a constriction in the slot to prevent the lock nut from passing through it, and inserting a taper pin in the slot at an opposite end of the seatpost in an interference fit to block the slot at that end, thereby preventing the lock nut from sliding out the ends of the slot.

To mount the seatpost of the present invention within the seat mast of a bicycle, the seatpost is telescoped within the tubular seat mast such that the slot is in registry with the radial hole in the seat mast wall. The seatpost is then displaced until the lock nut hole is in registry with the seat mast hole, and the bolt is inserted into the seat mast hole, through the slot, and is threaded into the lock nut. The seatpost is then displaced relative to the seat mast to its desired elevation, thereby causing the slot to slide relative to the fixed lock nut, and the bolt is tightened into the lock nut until the lock nut and bolt head clamp the adjacent portions of the seat mast and seatpost together. By tightening the bolt into the lock nut sufficiently, the seatpost is clamped to the seat mast with sufficient force to prevent movement of the seatpost relative to the seat mast. To reposition the seatpost, the bolt is merely loosened from the lock nut, the seatpost adjusted to the desired position, and the bolt again tightened against the nut.

Accordingly, it is an object of the present invention to provide a seatpost assembly having very little structure exposed outside of the seat mast of a bicycle to create drag; a seatpost assembly which does not create additional wind resistance by requiring structure that extends laterally from the seat mast; a seatpost assembly which comprises relatively few components and which may be mass produced; and a seatpost assembly which is relatively simple to adjust and provides a positive frictional engagement between the components to prevent seatpost slippage relative to the seat mast when properly tightened during use.

Other objects and advantages of the invention will be apparent from the following description, the accompanying drawings and the appended claims.

BRIEF DESCRIPTION OF THE DRAWINGS

FIG. 1 is a side elevation of a portion of a bicycle frame incorporating the seatpost assembly of the preferred embodiment of the invention;

FIG. 2 is an exploded view, in perspective, of the components of the preferred embodiment shown in FIG. 1; and FIG. 3 is the side elevation of FIG. 1 showing the seatpost and seat mast in section.

DESCRIPTION OF THE PREFERRED EMBODIMENT

As shown in FIGS. 1 and 3, the bicycle seatpost assembly of the preferred embodiment, generally designated 10, is designed to be incorporated into a bicycle frame 12 typically having a top tube 14 which is joined to the upper portion of a seat mast 16 to make a smooth, aerodynamic joint which does not utilize lugs or other mounting means that would provide surfaces for creating wind resistance or drag. A pair of seat mast stays or upper rears 18 extend upwardly from opposite sides of a rear toe plate 19 and are joined to the seat mast 16 in a similar fashion to minimize the aerodynamic drag of the connection.

As shown in FIGS. 1, 2, and 3, the seatpost assembly 10 consists of a seatpost 20 defining a longitudinal slot 22 along its length, a lock nut 24, a bolt 26, and the seat mast 16, which defines a radial hole 28 through an upper rearward wall. The seatpost 20 is attached to a standard bicycle seat 30 by conventional clamping means (not shown).

The longitudinal slot 22 formed in the seatpost 20 is generally cruciform in shape, having a pair of opposing channels 32 which are defined by side walls 34, forward shoulders 36, and rearward shoulders 38. The rearward shoulders 38 are located adjacent a longitudinal gap 40. The slot 22 also includes a forward channel 42 which is defined by a forward wall 44 and lateral walls 46, which are located adjacent the forward shoulders 36.

The lock nut 24 is preferably a ∓prevailing torque" self-locking nut which will not slip once tightened onto the bolt 26. The nut 24 is sized such that the distance between opposing faces 48 on the sides of the nut is less than the distance between the side walls 34 of the opposing channels 32, and the distance between the front and rear faces 50, 52, respectively, of the nut is less than the distance between the forward and rearward shoulders 36, 38, respectively. Thus, the nut can slidably engage the opposing channels 32 of the seatpost 20. While the clearance between the lock nut 24 and the slot 22 should be sufficient to permit the nut to be displaced within the slot with relative ease, the difference in the width of the nut as measured between the opposing faces 48 and the distance between the side walls 34 of the opposing channels 32 should not be so great as to permit the nut to rotate within the longitudinal slot 22. The nut 24 also includes a central threaded hole 54 for receiving the bolt 26.

The bolt 26 includes a threaded shank 56 which is sized to fit through the seat mast hole 28, the gap 40 and into the threaded hole 54 of the lock nut 24. The bolt includes a head 58 having means, such as a hex recess 60, for accepting a torque imparting tool such as an allen wrench to facilitate the threading of the shank 56 into the hole 54 of the lock nut 24. A washer 61 is mounted on the shank 56 of the bolt 26 adjacent the head 58. Alternatively, a bolt having a flanged head may be used without a washer.

In order to prevent the lock nut 24 from sliding out of the longitudinal slot 22 and down into the seat mast 16 during an adjustment operation, means are provided for preventing the removal of the lock nut from the slot. A taper pin 62 is press fitted into the slot 22 at an upper end 64 of the seatpost 20. The lower end 66 of the seatpost 20 is preferably crimped by well-known methods to form protrusions 68 in the side walls 34 of the opposing channels 32. The protrusions 68 extend into the opposing channels 32 sufficiently to prevent the lock nut 24 from passing over them. However, it should be understood that any well-known method of closing the ends of the longitudinal slot 22 can be employed without departing from the scope of the invention. In addition, the protrusions 68 can be formed at any point or points along the length of the seatpost 20 to provide a predetermined limited range of sliding movement of the lock nut 24 within the slot 22.

The operation of the seatpost assembly 10 is best shown in FIG. 3 and is as follows. To adjust the height of the seat 30 above the head tube 14, the seatpost 20 is first telescoped into the seat mast 16 and rotated so that the gap 40 is in registry with the hole 28 in the seat mast. The seatpost 20 is displaced within the seat mast 16 until the lock nut 24, which is held captive within the longitudinal slot 22 by the taper pin 62 and protrusions 68, is positioned adjacent the hole 28 so that the threaded hole 54 of the lock nut is in registry with the hole 28. The bolt 26 is then inserted into the hole 28 so that the shank 56 engages the threaded hole 54 of the lock nut 24, and the bolt is rotated sufficiently to engage the shank into the lock nut, but not so much as to impede the sliding movement of the seatpost 20 with the seat mast 16. The seatpost 20 is then positioned to the desired location so that the seat 30 is spaced a desired height above the head tube 14. The bolt 26 is then rotated and tightened, urging the lock nut 24 toward the head 58, thereby clamping an adjacent portion of the seatpost 20 against the adjacent portion of the seat mast 16.

When in the clamped position, the rear face 52 of the lock nut 24 engages the rearward shoulders 38 of the opposing channels 32, and the head 58 of the bolt 26 urges the washer 61 against the rearward portion of the seat mast 16 which surrounds the seat mast hole 28. It should be noted that the shank 56 of the bolt 26 must be sufficiently short so that the end of the shank does not contact the forward wall 44 of the forward channel 42 before the nut 24 is drawn sufficiently close to the head 58 to clamp the seatpost 20 to the seat mast 22. The metal washer 61 acts to distribute the clamping force over a greater area of the seat mast 16.

To reposition the seat 30 to a different desired elevation above the head tube 14, the process is reversed. The bolt 26 is rotated to back the lock nut 24 away from the rear wall of the seat mast 16, thereby loosening the seatpost 20 with respect to the seat mast 16. The seatpost is repositioned, and the bolt 26 is again tightened against the lock nut 24.

While the seatpost 20 can be made of any desirable metallic material, it is preferable to utilize a lightweight metal such as 6061-T6 aluminum which has been satin anodized to provide corrosion protection and additional aesthetic appeal. The prevailing torque self-locking nut is a well-known item which may be purchased from a number of commercial sources. However, it is preferable that the lock nut be zinc-plated to provide corrosion protection. The washer may be made of metal or other hard material.

While the form of apparatus herein described constitutes a preferred embodiment of this invention, it is to be understood that the invention is not limited to this precise form of apparatus, and that changes may be made therein without departing from the scope of the invention.

What is claimed is:

1. In combination with a tubular seat mast of a bicycle defining a radial hole through an upper rearward wall, a bicycle seatpost assembly comprising:

a cylindrical seatpost sized to telescope within said bicycle seat mast, said seatpost defining a longitudinal slot having side walls forming opposing channels;

means positioned within said slot and slidably engaging said opposing channels for threadingly receiving a bolt; and a threaded bolt extending through said radial hole in said rearward seat mast wall and into said slot to threadingly engage said bolt receiving means, said bolt having a head whereby said bolt may be threaded into said bolt receiving means to clamp a portion of said seatpost and a portion of said seat mast between said sliding means and said bolt head.

2. The seat post assembly of claim 1 wherein said sliding means includes a lock nut having opposing external faces spaced apart sufficiently to engage slidably said sidewalls forming said opposing channels such that said lock nut is prevented from rotating in response to rotation of said bolt.

3. The seatpost assembly of claim 2 wherein said seatpost includes means for preventing the removal of said lock nut from said slot.

4. The seatpost assembly of claim 3 wherein said lock nut removal preventing means comprises a taper pin inserted in said slot at an end of said seatpost in an interference fit, and said side walls of said slot include a constricted portion adjacent an opposite end of said seatpost.

* * * * *